United States Patent
Paker et al.

(10) Patent No.: US 10,374,844 B1
(45) Date of Patent: Aug. 6, 2019

(54) SIGNAL-EQUALIZATION WITH NOISE-WHITENING FILTER

(71) Applicant: NXP B.V., Eindhoven (NL)

(72) Inventors: Özgün Paker, Waalre (NL); Petrus Josephus Franciscus Hoeven, Schijndel (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/915,968

(22) Filed: Mar. 8, 2018

(51) Int. Cl.
*H04L 25/03* (2006.01)

(52) U.S. Cl.
CPC .... *H04L 25/03993* (2013.01); *H04L 25/0305* (2013.01); *H04L 25/0307* (2013.01); *H04L 25/03267* (2013.01)

(58) Field of Classification Search
CPC . H04L 2025/03617; H04L 2025/03522; H04L 25/03057; H04L 25/03159; H04L 2025/0349; H04L 2025/03496; H04L 2025/037
USPC .......... 375/346–350, 371–372, 229
See application file for complete search history.

(56) References Cited

U.S. PATENT DOCUMENTS

| | | | | |
|---|---|---|---|---|
| 5,841,484 A * | 11/1998 | Hulyalkar | ............... | H04N 5/211 348/607 |
| 6,067,319 A * | 5/2000 | Copeland | .......... | H04L 25/03057 370/350 |
| 6,426,983 B1 * | 7/2002 | Rakib | ................... | H04B 1/7102 375/346 |
| 6,460,150 B1 * | 10/2002 | Cideciyan | ........ | G11B 20/10009 375/341 |
| 6,690,717 B1 * | 2/2004 | Kim | ........................ | H04L 5/023 375/219 |
| 6,816,548 B1 * | 11/2004 | Shiue | ..................... | H04N 5/211 348/726 |
| 7,869,497 B2 | 1/2011 | Benvenuto et al. | | |
| 8,325,014 B1 * | 12/2012 | Sundstrom | ............ | G06Q 20/24 340/10.1 |
| 9,467,312 B2 | 10/2016 | Ganzerli et al. | | |
| 9,654,310 B1 | 5/2017 | Chang | | |
| 2004/0125235 A1 * | 7/2004 | Kim | ........................ | H04N 5/21 348/607 |
| 2006/0227902 A1 * | 10/2006 | Kaynak | ............. | H04L 25/03076 375/340 |
| 2006/0291553 A1 * | 12/2006 | Nemer | .............. | H04L 25/03057 375/233 |

(Continued)

OTHER PUBLICATIONS

D. Mansour et. al. "Unconstrained Frequency Domain Adaptive Filter", IEEE Transactions on ASSP, vol. 30, No. 5, 1982.

(Continued)

*Primary Examiner* — Emmanuel Bayard
(74) *Attorney, Agent, or Firm* — Rajeev Madnawat

(57) ABSTRACT

Signal equalization is provided, according to certain aspects, by a frequency-domain equalization circuit, a noise-whitening filter and a noise predictor. A sequencer is used to control ordering of the equalization circuit, a noise-whitening filter and a noise predictor. The equalization circuit provides equalization the frequency domain by converging on symbols of the input signal. The noise-whitening filter and the noise predictor filter colored noise from a signal responsive to the equalization circuit. The sequencer controls operation of the noise-whitening filter by detecting an indication of convergence of the symbols from input signal and causing the noise-whitening filter to commence suppression of colored noise from a signal derived from an output by the equalization circuit.

20 Claims, 3 Drawing Sheets

(56) References Cited

U.S. PATENT DOCUMENTS

| | | | |
|---|---|---|---|
| 2007/0104264 A1* | 5/2007 | Park | H04L 1/0071 375/233 |
| 2007/0263744 A1* | 11/2007 | Mostafa | H04B 7/0857 375/267 |
| 2008/0291335 A1* | 11/2008 | Markman | H04L 25/03057 348/725 |
| 2013/0259113 A1* | 10/2013 | Kumar | H04L 25/0307 375/233 |
| 2019/0028818 A1* | 1/2019 | Hiruma | H04R 25/453 |

OTHER PUBLICATIONS

D. Falconer et. al, "Frequency Domain Equalization for Single-Carrier Broadband Wireless Systems", IEEE Communication Magazine, 2002, pp. 58-66.

S. Haykin, "Adaptive Filter Theory: Third Edition", Prentice Hall, 1996, Chapter 10, Frequency Domain Adaptive Filters.

C. A. Belfiore et al., "Decision Feedback Equalization", Proceedings of the IEEE, 1979, vol. 67, Issue: 8, pp. 1143-1156.

D. Godard, "Self-Recovering Equalization and Carrier Tracking in Two-Dimensional Data Communication Systems", IEEE Transactions on Communications, vol. 28, No. 11, 1980.

Y. Zu et. al, "Single Carrier Frequency Domain Equalization with Noise Prediction for Broadband Wireless Systems", IEEE Global Telecommunications Conference, 2004, vol. 5, pp. 3098-3102.

N. Benvenuto et. al, "On the Comparison Between OFDM and Single Carrier Modulation With a DFE Using a Frequency-Domain Feedforward Filter", IEEE Transactions on Communications, 2002, vol. 50, No. 6.

* cited by examiner

SIGNAL-EQUALIZATION WITH NOISE-WHITENING FILTER

OVERVIEW

Aspects of various embodiments are directed to a frequency-domain decision feedback equalization circuits for relatively high-speed single carrier modulation, as might be used in a broadband-communication and automotive Ethernet communication systems.

A digital transmission is susceptible to impairments resulting in degradation of signal quality. Receivers for digital communications must be capable of recovering transmitted data from the received analog signal. The received signal may be corrupted by Intersymbol Interference (ISI) introduced by the transfer function of the communication channel, as well as by noise and crosstalk. Such signal interference can be especially problematic when data is conveyed wireless and/or at high speeds such as at 750 Megabits per second or by clock frequencies of at least 750 Mhz.

Currently, automatic adaptive equalizers are employed to minimize the signal loss. Automatic adaptive equalizers may be categorized into various types including linear equalization which can compensate for signal loss introduced by the transfer function of the communication channel. This type of circuit architecture, however, enhances noise and crosstalk at high frequencies which can result in signal loss. A non-linear equalizer is the decision feedback equalizer (DFE) can compensate for signal loss introduced by a channel transfer function without enhancing noise and crosstalk at high frequencies but typical DFE circuits are known to have various disadvantages. In one commonly-used DFE circuit which is referred to as direct feedback DFE, an estimation of the ISI coming out from certain processing of the input signal is subtracted by use of a sampler circuit and a summer. The sampler circuit quantizes the input signal and holds its output for a clock cycle, and the summer is positioned at the input of the sampler circuit for sampling and quantizing the output of the summer. The summer subtracts the estimated ISI from the input signal. The output of the sampler circuit is multiplied by a coefficient and fed into the summer, in order to update the value that the summer subtracts to compensate for the ISI.

This and other types of DFE architectures are largely adequate for many applications and particularly for those in which data is conveyed at relatively slow data rates such as at speeds below one half Gigabits per second. However, at higher speeds, such as at 750 Megabits per second or by clock frequencies of at least 750 Mhz, the equalization occurring at the front end of such DFE designs can enhance the noise to such levels that signal loss is intolerable. When the data rate requirements reach 1 Gbps and beyond (e.g., to at least a ~10x sampling rate increase), the channel length seen by the equalizer increases also by 10x, and the implementation of the DFE feedback filter becomes challenging. For instance, addition of 100 taps of 16-bit accuracy has to fit into 4/3 ns (i.e. 750 MHz clock frequency), and with a fast full adder delay on the order of 0.2 ns in 40 nm CMOS. Even though, an adder tree depth of several layers can be used to speed up addition, the delay added only to the final adder is already significant.

Among other challenges, typically-implemented DFE designs employ a training sequence for initially adapting to the input signal before effective signal processing can be carried out and for timing recovery in response to several signal-loss situations. For certain application domains such as Automotive Ethernet, the data in the input-signal channel is not known a-priori, and there is no training sequence.

SUMMARY

The above and other matters have presented challenges which are overcome by certain aspects and embodiments presented in this instant disclosure. For example, in certain specific embodiments, such aspects include, among others, an equalization design with an adaptive noise-whitening filter (NWF) which can be used as part of a feed-forward architecture which is advantageous for maintaining ease of pipelining and for processing in subsequent stages.

In connection with efforts leading to the instant disclosure, discoveries herewith concern circuit designs for ordering of the convergence of both an equalizer portion and a NWF portion of an equalizer architecture so as to guarantee proper convergence with optimal ISI performance. In specific proof of design experiments, certain embodiments have been proven even to outperform the noise suppression capability of known DFE carrying the input signal in categorically "bad" channels. In addition to performing optimal ISI cancellation, such circuit designs can implement noise-suppression on the post-cursor ISI taps and with a feed-back filter approach which is a multiplier-less implementation. From a signal processing perspective, such circuit designs can be implemented to provide such optimal levels of ISI cancellation and noise suppression, while meeting timing and cost demands associated with manufacture and implementation using CMOS technology.

In certain specific embodiments, presented as examples and without limitation, aspects are directed to circuitry having an equalization circuit, a processing circuit that includes a noise-whitening filter and a noise predictor, and a sequencer circuit. The equalization circuit provides equalization of an input signal in the frequency domain by converging on symbols of the input signal, whereas the noise-whitening filter and the noise predictor provide filtering of colored noise from a signal responsive to the equalization circuit. The sequencer circuit is designed to control operation of the noise-whitening filter by detecting an indication of convergence of the symbols of the input signal and, in response, causing the noise-whitening filter to commence suppression of colored noise from a signal corresponding to or derived from the signal output by the equalization circuit.

The equalization circuit can be configured and arranged to provide equalization of the input signal in the frequency domain by sampling data from a high-speed serial stream, such as carried at a rate of more than 800 megabits per second or at least 1 Gigabit per second.

In various other specific embodiments, also presented as examples and without limitation, aspects are directed to signal equalization circuitry which includes an equalization circuit, signal processing circuitry, and a control (or sequencer) circuit. The equalization circuit is configured and arranged to provide equalization of an input signal in the frequency domain by converging on symbols of the input signal, whereas the processing circuit includes a noise-whitening filter and a noise predictor, which are configured and arranged to filter colored noise from a signal responsive to the equalization circuit. The sequencer circuit controls operation of the noise-whitening filter by detecting an indication of convergence of the symbols of the input signal and, in response to the detection, causing the noise-whitening filter to commence suppression of colored noise from a signal corresponding to or derived from the signal output by the equalization circuit.

In yet further specific embodiments, the above-characterized signal-equalization circuitry may be implemented with the equalization circuit providing equalization of the input signal in the frequency domain by sampling data from a high-speed serial stream, carried at a rate of at least 800 or 1000 megabits per second, and/or with such equalization in the frequency domain by using an overlap method in which data is sampled from input signals running at any of various levels of high-speed serial streams.

Other important aspects which are also applicable to certain embodiments consistent with the above-characterized signal-equalization circuit types, are directed to operating the equalization circuit so that it operates in multiple modes including a blind mode occurring before the indication of convergence of the symbols of the input signal, and including a decision directed mode occurring after the indication of convergence of the symbols of the input signal.

Also, such equalization circuitry can be implemented in a variety of application domains, such as Automotive Ethernet, using a feed-forward architecture and with such a blind mode facilitating the equalization circuit progressing towards convergence without use or decoding of a training sequence in the input signal, and in a manner that enables timing recovery which is particularly beneficial for finding the optimal sampling phase when the equalization circuit is used in a system where the baud-rate is sampled.

The above discussion/summary is not intended to describe each embodiment or every implementation of the instant disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
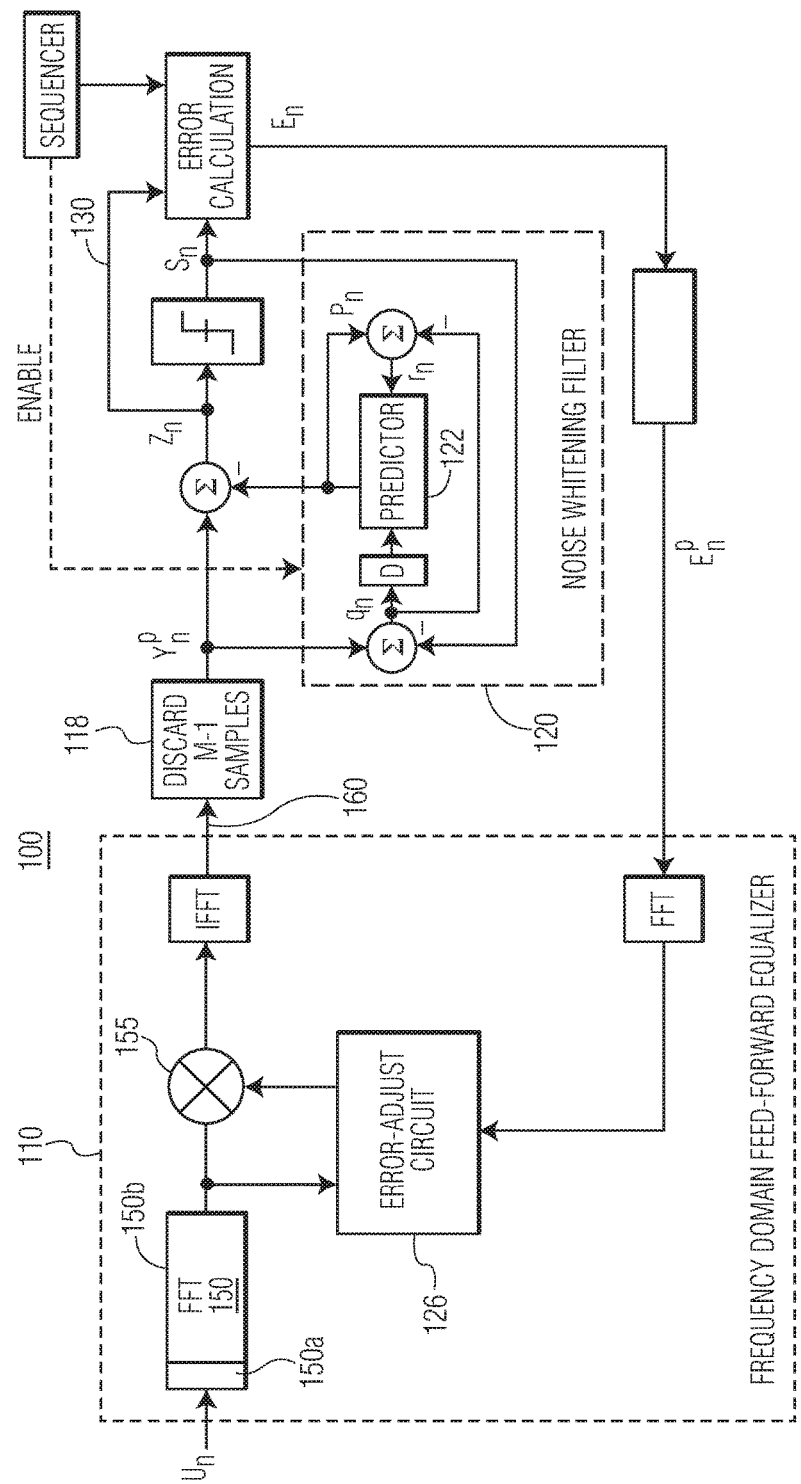
FIG. 1 is a circuit diagram illustrating an example signal-equalization circuit in accordance with the instant disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the instant disclosure are believed to be applicable to a variety of different types of apparatuses, systems and methods involving signal equalization for data communications including but not limited to broadband and wireless communications and in particular, high-speed data communications, such as approaching or exceeding 1 Gbit per second. In certain implementations, aspects of the instant disclosure have been shown to be beneficial when used in the context of Automotive Ethernet (e.g., concerning communications at such high-speeds) and where minimization of noise such as ISI and signal loss can be very important. In this context, one such example application is in products and derivatives of 1000Base-T1 (Gigabit Automotive Ethernet) and multi-gigabit transceivers as part of the PMA (Physical Medium Attachment) layer. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In accordance with specific embodiments discussed or illustrated by way of the instant disclosure, it is appreciated that there are many different types of implementations which can be employed. While such details might be important for specific applications, an appreciation of the instant disclosure might be best appreciated by way of a higher-level discussion of some of the main circuit blocks, such as a particular type of front-end equalization circuit and its pipelined output which drives a noise-whitening filter (NWF) operation. Consistent with such embodiments, a front-end equalization circuit is used in combination with a pipeline processing circuit and a control (or sequencer) circuit. The equalization circuit is configured and arranged to provide equalization of an input signal in the frequency domain by converging on symbols of the input signal, whereas the pipeline processing circuit includes a noise-whitening filter and a noise predictor, which are configured and arranged to filter colored noise from a signal responsive to the equalization circuit. The sequencer circuit controls operation of the noise-whitening filter by detecting an indication of convergence of the symbols of the input signal and, in response to the detection, causing the noise-whitening filter to commence suppression of colored noise from a signal corresponding to or derived from the signal output by the equalization circuit.

In more specific embodiments, the above-characterized signal-equalization circuitry may be implemented with the equalization circuit providing equalization of the input signal in the frequency domain by sampling data from a high-speed serial stream, carried at a rate of at least 800 megabits per second, and/or with such equalization in the frequency domain by using an overlap method in which data is sampled from input signals running at any of various levels of high-speed serial streams.

Consistent with the above-characterized circuitries, other aspects of the instant disclosure are applicable to certain specific embodiments are further discussed and exemplified below by way of circuit-flow diagrams and discussion, As examples, these aspects are directed to: operating the equalization circuit so that it operates in multiple modes including a blind mode occurring before the indication of convergence of the symbols of the input signal; and a decision-directed mode which occurs after the same or another indication of convergence of the symbols of the input signal. Such equalization circuitry can be implemented using a feed-forward architecture and with such a blind mode facilitating the equalization circuit progressing towards convergence without the use or decoding of a training sequence in the input signal. Yet other aspects, which can be implemented in certain specific embodiments, are directed to a feed-forward adaptive equalizer in frequency domain combined with a forward noise predictor for noise suppression in time domain.

Turning now to the figures, FIG. 1 shows a circuit diagram illustrating such an example signal-equalization circuit 100, in accordance with the instant disclosure. The circuit 100 includes a front-end section including or referred to as equalization circuit 110 and with appropriate processing circuitry which includes, after sample adjustment via circuit 118, a noise-whitening filter 120 and a noise predictor 122. The equalization circuit 110 is configured and arranged to provide equalization of an input signal in the frequency domain by converging on symbols of the input signal. The noise-whitening filter 120 and the noise predictor 122 are configured and arranged to filter colored noise from a signal responsive to the equalization circuit. Further, a sequencer circuit 130 is configured and arranged to control operation of the noise-whitening filter 120 by detecting an indication of convergence of the symbols from input signal (at $U_n$) and, in response to the detection, causing the noise-whitening filter 120 to commence suppression of colored noise from a signal corresponding to or derived from the signal output by the equalization circuit 110 which is used to feed the remainder of the circuit 100, including the noise-whitening filter 120, the noise predictor 122 and the sequencer.

Using this type of channel equalizer and predictor architecture, a feed-forward channel equalization architecture can be used for noise suppression via the feed-forward structure of the signal processing in that there is no substantive feedback. In this context, it will be appreciated that there is some error-adjust feedback, via error adjust circuit 126, to account for weight adaptation. This involves error feedback but because the channel changes very slowly. As will be discussed in connection with FIG. 3, this path can be parallelized without effecting the overall performance of equalization circuit 110.

Within the equalization circuit 110, FIG. 1 illustrates a circuitry 150 which performs oversampling (150a) on a high-speed input signal ($U_n$) and then domain transformation for signal transformation to the frequency domain. This is achieved using a Fast-Fourier Transform (FFT) algorithm (150b) which can be implemented via software or firmware in a microcomputer or by configuration in a specialized/PLA logic circuit (each depicted by 150). In this manner, the high-speed input signal ($U_n$) is received in the time domain, converted to the frequency domain during which time error feedback is provided at combiner circuitry 155 (part of the channel equalization), and then an Inverse-Fast-Fourier Transform (IFFT) algorithm is carried out by similar processor/logic circuitry 150 before the equalization circuit 110 outputs channel-equalized data at an output port 160 for further processing in the time domain.

To the right side of the equalization circuit 110, FIG. 1 shows a block diagram (or generalized depiction) of circuitry which can be used to provide the filtering for white noise and for noise-whitening filter prediction. From the output port 160, a sample-adjustment circuit 118 is used to adjust the channel-equalized data by discarding M−1 samples, where M refers to the number of channels used in the frequency-domain channel equalization process at circuit 150. This operation is to account for the oversampling at 150a. From the sample-adjustment circuit 118, flow proceeds to the noise-whitening filter 120 and the noise predictor 122 where white noise and predicted noise are filtered dynamically and as controlled by the sequencer 130 which assures controlled convergence of the front-end circuitry, including the equalizer circuit 110, and also the back-end circuitry which includes the noise-whitening filter 120 and the noise predictor 122.

The noise predictor 122 can also be implemented as a feed-forward filter as it tracks noise at the output of the equalization circuit 110 and ignores slicer decisions coming from the output of the slicer or slicing operation of the input signal as it is processed by the equalization circuit 110. In this context, it is noted that the feedback path/slicer output does not contribute to the operation of the filtering, and that because the exemplified design has noise-whitening filter 120 using a reliable slicer output, the sequencer 130 is important in that it controls the ordering of the convergence of both the equalization circuit 110 and the noise-whitening filter 120. By using the sequencer 130 to enable the noise-whitening filter 120 at the appropriate time, relative to operation of the noise predictor 122, the equalization circuit 110 converges properly. Moreover and surprisingly, this front-end (equalization-block) convergence occurs with optimal ISI performance and with performance that is significantly better than noise suppression capabilities demonstrated by typically-implemented DFE designs.

In a specific example involving an experimental (e.g., proof of concept) design, the type of design illustrated in connection with FIG. 1 was implemented using more than 100 taps for front-end channel equalization, and the feed-forward equalization demonstrated optimal ISI cancellation provided that the equalizer length is greater (or equal) than the channel delay spread (i.e., 100 taps). Noise prediction in this type of design suppresses noise induced by both pre-cursor ISI as well as post-cursor ISI, thereby surpassing noise suppression performance provided by such a DFE designs which can only suppress noise due to post-cursor ISI.

For such feed-forward equalizer where at least 100 taps are used, implementation of the front-end channel equalization is performed in the frequency domain. This can be done using an unconstrained frequency domain equalization approach for low-level complexity (e.g., about 3 times to 4 times lower than multiply accumulates per second, as opposed to a corresponding feed-forward equalization approach in the time domain.

Referring again to FIG. 1 for ease of explanation, the noise predictor 122 is implemented in the time domain because of its cooperation and connectivity with the slicer output at port 160. Because this type of noise predictor design mainly utilizes auto-correlation features of the equalizer output, the depth of such a filter is inherently much smaller than the length of the channel. Therefore, the noise predictor is in practice only a few taps (2-4 taps) depending on the channel and simple to implement. The feedback filter of the DFE architecture suppresses noise but its main functionality is to equalize post-cursor ISI, hence in practice is a long filter (e.g. ~90 taps in 100 taps long channel). In this context, it is appreciated that the noise predictor 122 does not adversely affect the complexity of the overall architecture of circuit 100, but yet performs the important function of noise suppression.

Because the equalizer circuit 110 has to learn the a-priori unknown channel, and the noise predictor requires reliable slicer output decisions, the sequencer 130 is employed to control the adaptation order as follows. First, the adaptation of the feed-forward equalizer circuit 110 starts its operation in a blind mode (i.e., the output signal is inferred (equalized) from the input signal, while making use only of the transmitted signal statistics). This mode is also characterized as using a blind cost function for adaptation. Next, after the blind mode has converged and enabled a proper timing recovery, slicer decisions are reliable the circuit 100 switches from the blind mode to a mode in which decisions are directed ("decision-directed mode" in which slicer error is used for adaptation. Finally, the sequencer 130 enables the noise-whitening filter 120 and the noise prediction filter 122, allowing some time for the decision-directed mode to fully converge. In certain high-speed implementations, it can be important that the slicer output is reliable and the noise prediction filter convergence is not disturbed.

Figure 2:
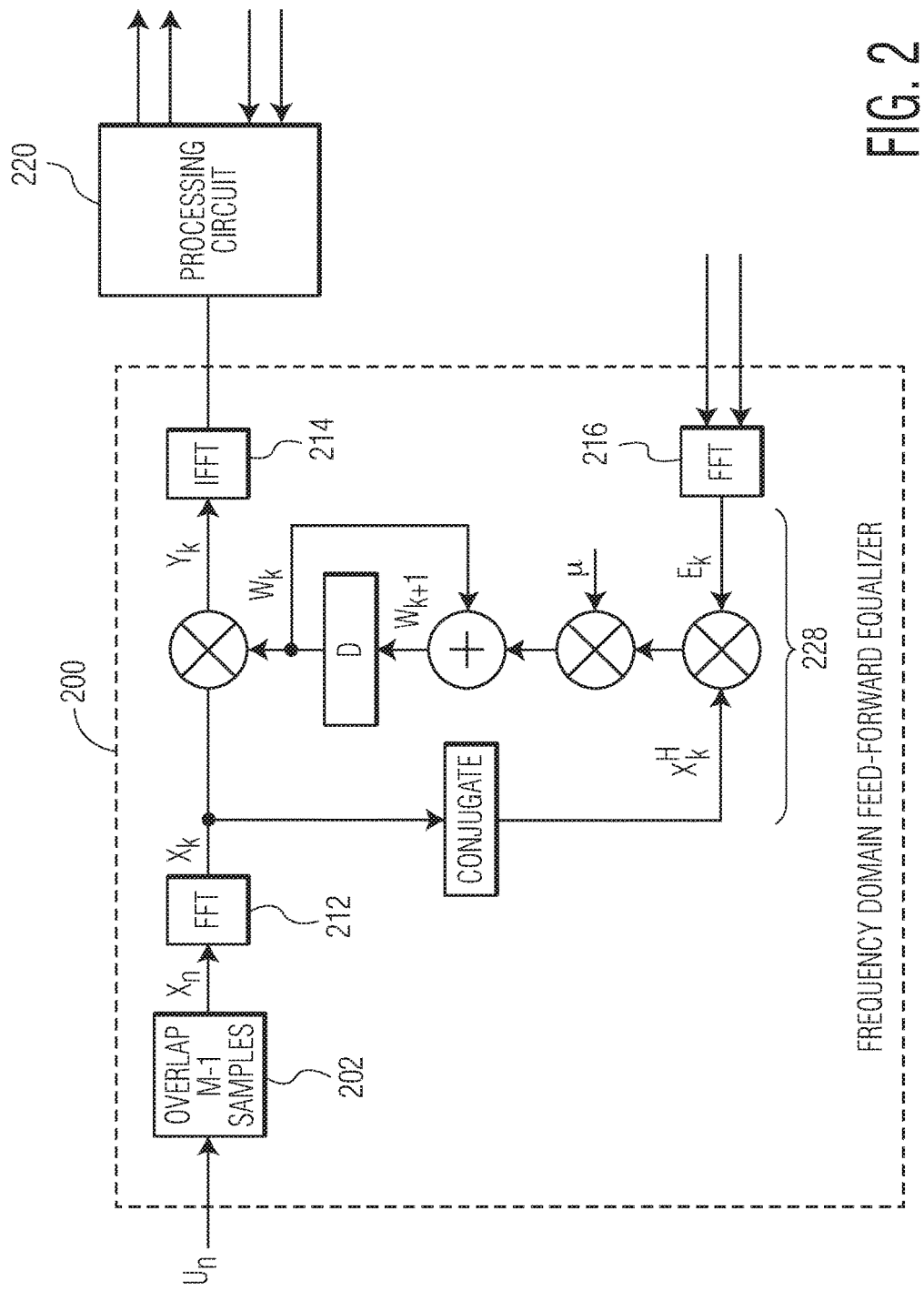
FIG. 2 is another circuit diagram illustrating a specific example frequency-domain equalization circuit in accordance with the instant disclosure.

Also in accordance with the instant disclosure, FIG. 2 is another circuit diagram illustrating a more-specific example of signal-equalization which is similar to the example front-end circuit 110 shown in FIG. 1. In the circuitry of FIG. 2, a high-speed input signal ($U_n$) provides blocks of the input data bits and, as in FIG. 1, the circuitry shown in FIG. 2 includes an equalization circuit 200 with an oversampling circuit 202 and with a processing circuit 220, both operating in the time domain. As with the circuit 118 of FIG. 1, the processing circuit 220 of FIG. 2 is used to account for oversampling performed by the circuit 202.

Also consistent the circuit blocks shown in FIG. 1, the circuit 200 includes both an FFT 212 which receives the oversampled bits in the time domain for conversion to the frequency domain. An IFFT block 214 algorithm is performed before the equalization circuit 200 outputs channel-equalized data to the processing circuit 220. An error correction signal is received at another FFT 216, as the circuit 200 performs such correction in the frequency domain via error-correction feedback circuitry 228.

These above-discussed blocks in FIG. 2 are characterized and denoted in such a way to facilitate a signal-processing understanding in view of the following discussion which is mathematically directed for an appreciation of an exemplary feed-forward equalization implementation (operating on signals in the frequency domain) consistent with aspects of the instant disclosure. Moreover, as exemplary embodiments of the instant disclosure have been found to benefit applications including automotive, where problems associated with the automotive Ethernet standards have been noteworthy. For example, with high speed automotive Ethernet (Gbps and more), channel delay spread is expected to be beyond 100 taps and the conventional DFE architecture that has worked at lower data rates (100 Mbps), are not feasible from a silicon implementation perspective. This follows because as at those data rates, processing cannot be achieved to reach high clock rates required (e.g., 750 MHz) due to the feedback filter inherent in the equalizer architecture.

The automotive Ethernet standard does not provide a cyclic prefix (an OFDM feature) at the transmitter side. Therefore, to be able to perform equalization in frequency domain, a conventional method (commonly referred to as the overlap save method) can be used. Accordingly, assuming that the maximum channel delay spread is M, and that the input stream is divided into blocks of L samples, the equalizer buffers L samples. In the overlap save method, the equalizer prepends M−1 samples from the previous data block forming a larger block of size N (i.e. N=L+M−1).

Thus, in FIG. 2, the input signal ($U_n$) is shown being processed by sampler circuit 202 which provides such overlap sampling from the previous block of the input signal.

Here, we assume $U_n$ shows L new input samples at time n such that $U_n = \{u_n u_{n-1} \wedge u_{n-L+1}\}$. By overlapping M−1 samples from the previous block, a new block of N samples $X_n$ is formed such that $X_n = \{u_n u_{n-1} \wedge u_{n-L+1} u_{n-L} u_{n-L-1} \wedge u_{n-L-M+1}\}$. An N-point FFT is performed on $X_n$ to compute frequency domain representation of the input data as given in equation (1) as follows:

$$X_k = FFT\{X_n\} \quad (1)$$

The output of the equalizer in frequency domain is a simple multiplication of adapted filter coefficients $W_k$ which are also in frequency domain with the data such that:

$$Y_k = X_k \cdot W_k \quad (2)$$

The adaptation of the filter coefficients is performed fully in frequency domain by:

$$W_{k+1} = W_k + \mu \cdot X_k^H \cdot E_k \quad (3)$$

In Equation (3), $\mu$ is a scalar and denotes the step size for the adaptation, $X_k^H$ is the complex conjugate of $X_k$ and $E_k$ denotes the adaptation error profile in frequency domain. Calculation of $E_k$ depends on the mode of the equalizer and will be explained later. First let's concentrate of the signal data path. The output of the filter in time domain is simply an inverse FFT of $Y_k$.

$$Y_n = IFFT\{Y_k\} \quad (4)$$

The time domain filter output will be: $Y_n = \{y_n y_{n-1} \wedge y_{n-L+1} y_{n-L} y_{n-L-1} \wedge y_{n-L-M+1}\}$. The M−1 samples corresponding to the overlap i.e. $Y_n = \{y_{n-L} y_{n-L-2} \wedge y_{n-L-M+1}\}$ should be discarded. Note that these samples were computed properly in the previous block. The considered output of the equalizer for the rest of the computation is $Y_n^P = \{y_n y_{n-1} \wedge y_{n-L+1}\}$.

During the initial convergence where the equalizer adapts to the channel, the noise predictor is not enabled, thus the slicer input is a direct copy of the equalizer output.

$$Z_n = Y_n^P \quad (5)$$

The slicer essentially maps the block $Z_n = \{z_n z_{n-1} \wedge z_{n-L+1}\}$ to discrete PAM levels. For instance, automotive Ethernet standard uses symbol levels of $\{1, 0, -1\}$. The function is performed on the individual samples $z_n$ using the following formula:

$$s_n = \begin{cases} 1 & z_n \geq 0.5 \\ 0 & -0.5 < z_n < 0.5 \\ -1 & z_n \leq -0.5 \end{cases}$$

Referring now to both FIGS. 1 and 2, an example approach for error calculation is explained. Recall that the equalizer works in two modes: blind and decision-directed. Therefore, the adaptation error is calculated in two ways. During the blind mode, the equalizer opens up the eye and allows relatively reliable and error free slicer output, thereby allowing proper clock recovery. The adaptation error per sample is denoted as $e_n$ and is calculated in the time domain in the blind mode as follows:

$$e_n = z_n \cdot (z_n^2 - 1) \quad (6)$$

With the use of a timer, the equalizer is allowed to converge close to optimal taps and then switch to the decision directed mode where the adaptation error is calculated as the difference between equalizer output and slicer output given in:

$$e_n = z_n - s_n \quad (7)$$

The adaptation error for a block in time domain as shown in FIG. 1 is computed and formed as a collection of individual error samples $E_n = \{e_n e_{n-1} \wedge e_{n-L+1}\}$. For the discarded samples, M−1 zeros are inserted as to form a block of N samples such as $E_n^P = \{e_n e_{n-1} \forall e_{n-L+1}\ 00 \wedge 0\}$. After performing FFT on the time domain block $E_n^P$, we achieve the error adaptation profile in frequency domain used in (3) as follows:

$$E_k = FFT\{E_n^P\} \quad (8)$$

In light of the above discussion of an exemplary manner for implementing the front-end circuitry, the following discussion provides an example way for implementing the back-end circuitry of FIG. 1, and particularly the noise whitening filter 120 of FIG. 1. Provided that M (the length of the filter) is longer than the delay spread in the channel i.e. the number of taps involved in the channel transfer function, the proposed frequency domain equalizer achieves optimal ISI cancellation. However, the front-end equalizer circuit will also amplify the noise at the output of the channel which is superimposed on $U_n$. The noise whitening filter 120 addresses this issue. Compared to the DFE architecture, which has a very long feedback filter cancelling noise, the noise whitening filter 120 can be implemented much shorter. The reason why the feedback filter of the DFE architecture is long is due to the channel delay spread. The DFE is also cancelling ISI related to post-cursor and therefore is long when the channel delay spread is large.

According to the instant disclosure, the approach for filtering white noise is short because its task is not to cancel ISI, but rather only de-color noise at the output of the equalizer circuit 110 (e.g., by filtering or de-coloring only noise at the output of the equalizer circuit 110). The de-coloring of noise after the equalizer is generally dependent on the cross-correlation of the equalizer taps (which are inherently much shorter than the channel delay spread). Furthermore, according to the instant disclosure the approach for filtering white noise uses the noise whitening filter to cancel all colored noise, both due to pre-cursor and post-cursor ISI (the former not being addressed by DFE).

The noise whitening filter 120, which operates in the time domain, operates when the front-end equalizer converges. Once the front-end equalizer circuit converges, the output signal from the equalizer is a combination two things: the transmitted PAM (pulse-amplitude modulation) symbol and colored noise. The coloring of noise is due to the convolution of noise with equalizer weights. Assuming such transmitted PAM symbol and noise are denoted with and $q_n$ respectively, then the output of the equalizer per sample is $$y_n = \hat{s}_n + q_n \quad (9)$$

Once the slicer decisions are reliable (i.e. they match the transmitted PAM symbol such that $s_n = \hat{s}_n$), the input of the noise predictor becomes only colored noise, denoted as $q_n$ as shown in FIG. 1. The predictor filter is a simple adaptive FIR trying to predict $q_n$ based on past samples $q_{n-1} q_{n-2} \wedge q_{n-F}$ where F is the depth of the filter. For the channel models reflecting the gigabit ethernet standard, F can be expected to be small, 2-3. The noise predictor filter output $p_n$ is calculated as:

$$p_n = \sum_{i=1}^{F} c_{n,i} \cdot q_{n-i} \quad (10)$$

The prediction error $r_n$ is simply the difference between predictor output $p_n$ and the actual colored noise $q_n$ at its input such that:

$$r_n = p_n - q_n \quad (11)$$

The weights of the predictor are adapted according to:

$$c_{n+1,i} = c_{n,i} - \alpha \cdot q_{n,i} \cdot r_n, i = 1 \wedge F \quad (12)$$

In equation (12), $\alpha$ denotes the step size, and $c_{n,i}$ is the i'th coefficient at sample n.

As described above, the convergence of the frequency domain feed-forward equalizer and the noise whitening filter are ordered. The equalizer as mentioned already consists of two modes. The noise whitening filter convergence starts when there is reliable slicer output (from the front-end equalizer circuit 110). One of various ways to implement this ordered sequence is to use a timer logic circuit (inside the sequencer 130) for ordering of the front-end equalizer circuit convergence and noise whitening filter. The order of the convergence for the equalizer means a proper selection of the adaptation error. To this end, the sequencer works in the following order:

Start with blind mode, use equation (6) for equalizer adaptation

Allow the equalizer to adapt in blind mode for a few milliseconds (with the actual duration being programmable by a timer circuit)

Switch to decision directed mode and use equation (7) for equalizer adaptation

Allow the equalizer to adapt in decision directed mode for a few milliseconds (with the actual duration being programmable by a timer circuit)

Enable the noise whitening filter.

Figure 3:
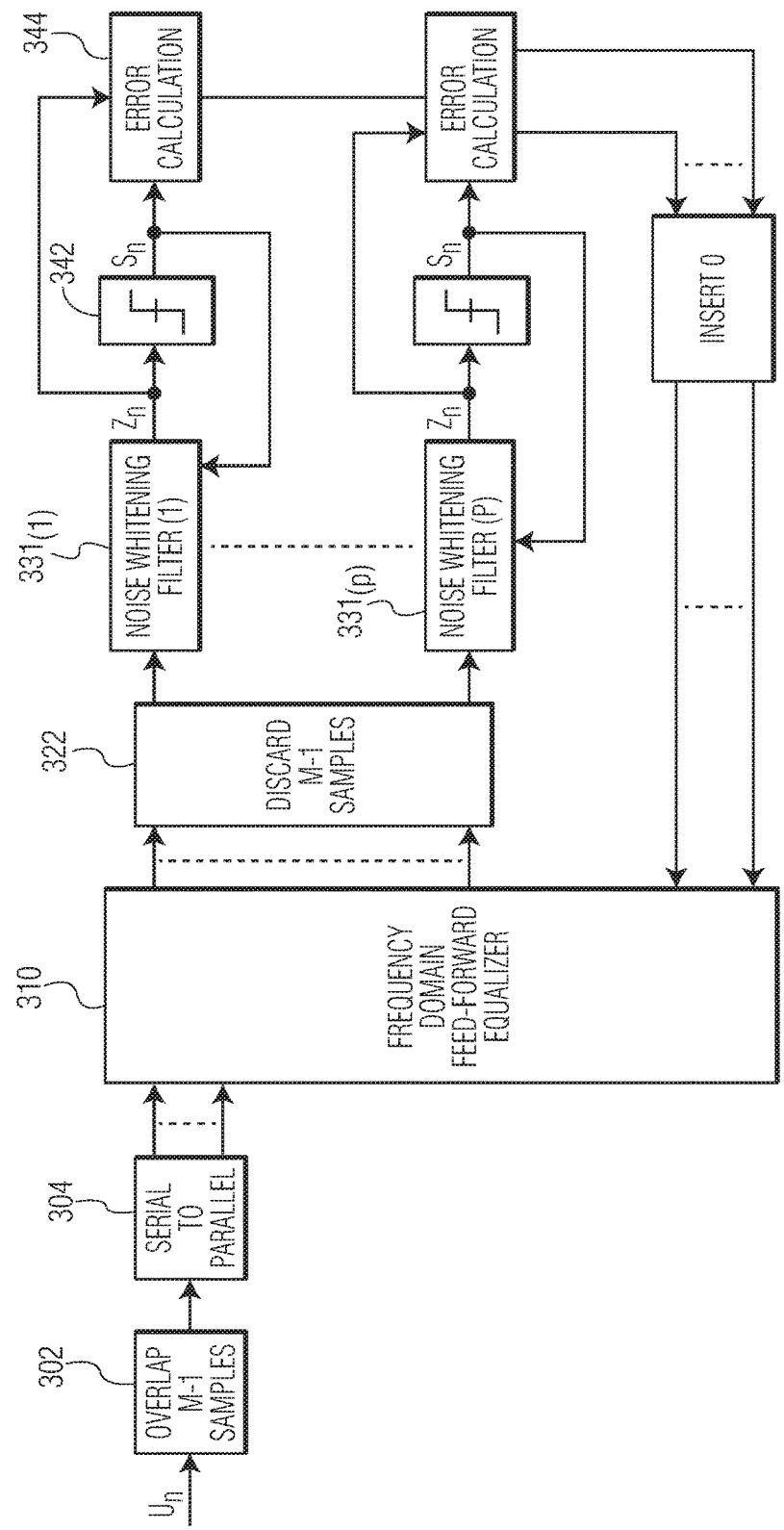
FIG. 3 is yet another circuit diagram illustrating a more-specific example signal-equalization circuit in accordance with the instant disclosure.

Also consistent with the circuitry shown and discussed in connection with each of FIG. 1 and FIG. 2, FIG. 3 is yet another circuit diagram illustrating another specific example of signal equalization in accordance with the instant disclosure. As shown in FIG. 3, signal processing of the data into and out of front-end equalizer circuit 310 involves parallel processing. Thus, after overlap sampling at block 302, the oversampled data (overlapped block of data as N items) is input to a serial-to-parallel converter 304. The serial-to-parallel converter 304 parallelizes this stream of data into P sub-blocks of data of size (N/P).

The (frequency-domain) equalizer circuit 310 then processes P sub-blocks in parallel, thereby reducing the system clock needed for processing. This can be achieved by the equalization circuit being configured with multiple similarly-constructed stages (e.g., each as shown at 110 in FIG. 1) and configured to operate on the input signal after the input signal is separated by the serial-to-parallel converter 304 into a plurality of data channels. Using the equalization circuit configured in this manner to include a plurality of stages, each of the stages is configured to operate on a respective one of the plurality of data channels.

In this manner, the equalizer produces P data outputs in one clock cycle. Each P output of the equalizer is first processed at block 322 to discard samples (to account for block 302) and then processed by a separate noise whitening filter 331 such as discussed above in connection with one such noise whitening filter 120 of FIG. 1. Therefore the system has P noise whitening filters $331_{(1)}$-$331_{(P)}$ working in parallel. From each of the noise whitening filters 331, the output data ($Z_n$) is integrated (at 342) for error calculation (at 344) as described above and in connection with FIG. 1. Only one of the noise whitening filters (e.g., the $1^{st}$ one) is allowed to adapt its coefficients. The P−1 remaining noise whitening filters re-use the coefficients of the adaptive filter (e.g., the $1^{st}$ filter).

Using this type of frequency-domain equalization as in each of the embodiments discussed above, high-performance high-speed implementations are feasible on target CMOS technology.

Terms to exemplify orientation, such as upper/lower, front-end/back-end, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, sequencer, filter and/or other circuit-type depictions (e.g., as denoted by various reference numerals shown in the blocks of FIGS. 1, 2 and 3). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in each of the above Figures. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process implemented by a computer (or digital signal processor circuit) in software (e.g., to perform the related steps, functions, operations, and activities noted above such as detecting an indication of convergence of the symbols of the input signal in the front-end equalization circuitry and, in response to the detection, causing the noise-whitening filter to commence suppression of colored noise from a signal corresponding to or derived from the signal output by the front-end equalization circuitry). Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims

What is claimed is:

1. A circuit comprising:
an equalization circuit configured and arranged to provide equalization of an input signal in a frequency domain by converging on symbols of the input signal;
a processing circuit including a noise-whitening filter and a noise predictor, the noise-whitening filter and the noise predictor being configured and arranged to filter colored noise from a signal responsive to the equalization circuit; and
a sequencer circuit configured and arranged to control operation of the noise-whitening filter by detecting an indication of convergence of the symbols of the input signal and, in response to the detection, generating a signal that causes the noise-whitening filter to commence suppression of colored noise from a signal corresponding to or derived from a signal output by the equalization circuit.

2. The circuit of claim 1, wherein the equalization circuit is further configured and arranged to provide equalization of the input signal in the frequency domain by sampling data from a high-speed serial stream, carried at a rate of at least 800 megabits per second.

3. The circuit of claim 1, wherein the equalization circuit is further configured and arranged to provide equalization of the input signal in the frequency domain by using an overlap method in which data is sampled from a high-speed serial stream, carried at a rate characterized by signals conveying data at least 750 Megabits per second or by clock frequencies of at least 750 Mhz.

4. The circuit of claim 1, wherein the equalization circuit is further configured and arranged to operate in multiple modes including a blind mode occurring before the indication of convergence of the symbols of the input signal, and including a decision directed mode occurring after the indication of convergence of the symbols of the input signal.

5. The circuit of claim 1, wherein the equalization circuit is further configured and arranged to operate using a feed-forward architecture and to operate in multiple modes including a blind mode which occurs before the indication of convergence of the symbols of the input signal, and which facilitates the equalization circuit progressing towards convergence without use or decoding of a training sequence in the input signal.

6. The circuit of claim 1, wherein the equalization circuit is further configured and arranged to operate in multiple modes including a blind mode which occurs before the indication of convergence of the symbols of the input signal, and which facilitates the equalization circuit progressing towards convergence, and wherein the equalization circuit is further configured and arranged to provide equalization of the input signal in the frequency domain by using an overlap method in which data is sampled from a high-speed serial stream, carried at a rate of at least 1 Gigabit per second.

7. The circuit of claim 1, further including circuitry, coupled to the equalization circuit and the processing circuit, configured and arranged to transform data from the frequency domain signal to a time domain, and wherein the noise-whitening filter and a noise predictor are further configured and arranged to process the signal responsive to the equalization circuit, in the time domain.

8. The circuit of claim 1, wherein the equalization circuit, the processing circuit and the sequencer circuit are configured and arranged to optimize ISI (intersymbol interference) cancellation.

9. The circuit of claim 1, further including an overlap-resolve circuit, wherein the equalization circuit includes a sampler circuit configured and arranged to sample signals to facilitate an overlap method in which data is sampled from the input signal, and further includes a circuit configured and arranged to transform data from the a domain signal to the frequency domain for further signal processing by a feedforward equalization circuit, and wherein the overlap-resolve circuit is configured and arranged to discard samples, in respond to oversampling carried out by the overlap method and, in response, to provide a resolved signal for processing by the noise-whitening filter.

10. The circuit of claim 1, wherein the equalization circuit is configured to operate on the input signal after the input signal is separated into a plurality of data channels, and wherein the equalization circuit includes a plurality of stages, each configured to operate on a respective one of the plurality of data channels.

11. The circuit of claim 1, further including a serial-to-parallel conversion circuit configured to receive the input signal as a serial stream of data blocks and to convert and output the input signal into a plurality of data channels.

12. The circuit of claim 1, wherein the sequencer circuit is further configured and arranged to control ordering of convergence associated with the equalization circuit and the noise-whitening filter to facilitate proper convergence by the equalization circuit.

13. A noise-filtering circuit for use with an equalization circuit that is designed to provide equalization on an input signal by converging on symbols of the input signal via operation in a frequency domain, the noise-filtering circuit comprising:
 a noise-whitening filter and a noise predictor, the noise-whitening filter and the noise predictor being configured and arranged to filter colored noise from a signal responsive to the equalization circuit; and
 a sequencer circuit configured and arranged to control operation of the noise-whitening filter by detecting an indication of convergence of the symbols of the input signal and, in response to the detection, generate a signal that causes the noise-whitening filter to commence suppression of colored noise from a signal corresponding to or derived from a signal output by the equalization circuit.

14. The circuit of claim 13, wherein the noise-filtering circuit includes a plurality of similarly-constructed circuits, each having one of the noise-whitening filter and the noise predictor configured and arranged to work in parallel.

15. The circuit of claim 13 wherein the noise-filtering circuit includes a plurality of similarly-constructed circuits, each having one of the noise-whitening filter and the noise predictor configured and arranged to work in parallel, and wherein the noise-filtering circuit provides data in a plurality of feedback pathways to the equalization circuit.

16. The circuit of claim 13, wherein the sequencer circuit is further configured and arranged to control ordering of convergence associated with the equalization circuit and the noise-whitening filter to facilitate proper convergence by the equalization circuit.

17. A noise-filtering circuit for use with an equalization circuit that is designed to provide equalization on an input signal by converging on symbols of the input signal via operation in a frequency domain, the noise-filtering circuit comprising:
 a noise-whitening filter and a noise predictor, the noise-whitening filter and the noise predictor being configured and arranged to filter colored noise from a signal responsive to the equalization circuit;
 an activation-control circuit configured and arranged to effectively enable and disable colored-noise filtering performed by the noise-whitening filter; and
 a sequencer circuit configured and arranged to generate a control signal that enables colored-noise filtering performed by the noise-whitening filter in response to an indication of convergence of the symbols of the input signal and to disable colored-noise filtering performed by the noise-whitening filter for a period before the indication.

18. The circuit of claim 17, wherein the indication of convergence of the symbols of the input signal occurs commensurate with an approximation of progress toward actual convergence.

19. The circuit of claim 17, wherein the sequencer circuit is further configured and arranged to control ordering of convergence associated with the equalization circuit and the noise-whitening filter.

20. The circuit of claim 17, wherein the sequencer circuit is further configured and arranged to control ordering of convergence associated with the equalization circuit and the noise-whitening filter, and to enable the noise-whitening filter 120 at an appropriate time, relative to operation of the noise predictor, with the appropriate time facilitating proper convergence by the equalization circuit.

* * * * *